June 9, 1964
H. G. MANSON
3,136,590
COLLECTOR-RING ASSEMBLY
Filed July 7, 1961
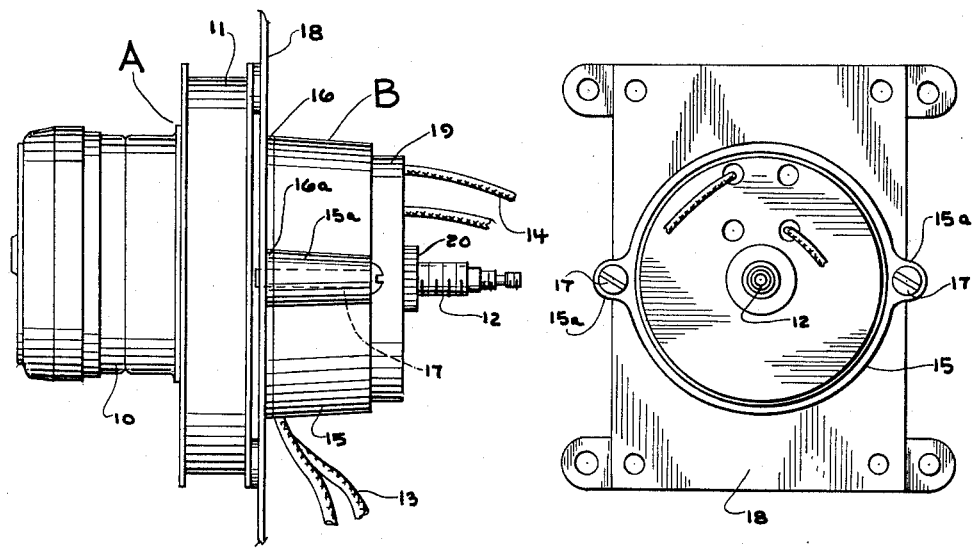
FIG. 1
FIG. 2
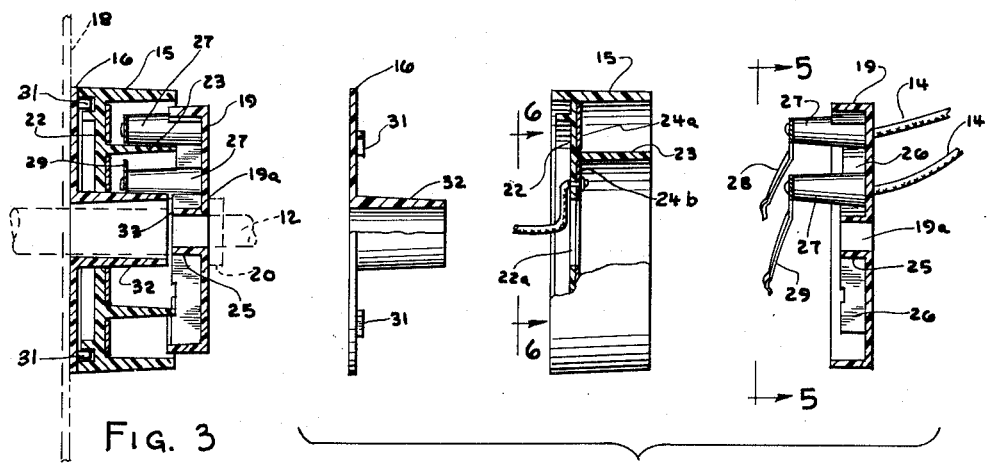
FIG. 3
FIG. 4
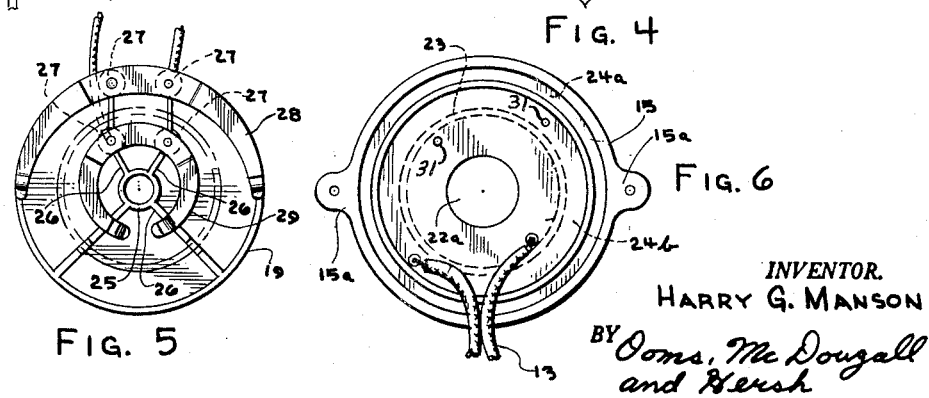
FIG. 5
FIG. 6
INVENTOR.
HARRY G. MANSON
BY Ooms, McDougall
and Hersh
ATTYS.

United States Patent Office 3,136,590
Patented June 9, 1964

3,136,590
COLLECTOR-RING ASSEMBLY
Harry G. Manson, Princeton, Ind., assignor to Hansen Manufacturing Company, Inc., Princeton, Ind., a corporation of Indiana
Filed July 7, 1961, Ser. No. 122,434
3 Claims. (Cl. 339—5)

This invention relates to a collector-ring assembly adapted for use in transferring electric power between objects which are rotating relative to one another. The present invention is characterized by ingenious simplicity of structure, low cost of manufacture, and easy disassembly when desired.

Collector-ring assemblies, per se, have been long known, being used, for example, in motors and generators as the means of feeding electric current to or from rotating armatures. Prior-art devices of this type, however, have in general been complex and costly, requiring accurately machined rings and expensive contact-brush assemblies. This has greatly restricted their fields of use. By contrast, it is a major object of the present invention to provide a novel collector-ring assembly wherein all the components are inexpensive, no precision clearances are involved, and the use of machined parts is unnecessary.

A further object of this invention is to provide an inexpensive collector-ring assembly adapted to be directly mounted on the frame and shaft of a small electric power unit, such as an electric clock movement. My invention, used in this way, facilitates the electric illumination of rotating objects carried by the shaft of such a power unit, examples of such objects being clock hands, rotating advertising displays, and the like.

Other objects and advantages of the invention will appear from the following detailed description of a typical embodiment thereof.

In the appended drawing FIG. 1 shows in side elevation a typical collector-ring assembly embodying my invention, mounted on the frame and shaft of a small electric power unit. FIG. 2 is a plan view of the FIG. 1 unit, showing my collector-ring assembly as it appears to a viewer looking directly along the axis of the power-unit shaft. FIG. 3 is a sectional view of my collector-ring assembly, shown in assembled form as mounted on a motor frame and shaft. FIG. 4 is an exploded view in the same type of section as FIG. 3, bringing out the individual structures of the three sub-assembled parts which together comprise my collector-ring assembly. FIG. 5 is a plan view of the brush-carrying component of my invention, the view being in the direction indicated by the line 5—5 of FIG. 4. FIG. 6 is a plan view, from the rear side, of the ring-carrying component of my collector-ring assembly, the view being along the direction indicated by the line 6—6 of FIG. 4.

In FIG. 1 I show in side elevation a typical small electric power unit indicated generally at A, comprising an electric motor 10, which may be of the synchronous type, and a gear box 11, operative in conventional manner to step down the rotational speed of the motor 10 to a value suitable for the application at hand. In an electric clock, this may be one revolution per hour; in a display advertising sign, it might be a few revolutions per minute. Projecting from the gear box 11 is an outer shaft 12 which is rotated, continuously or intermittently, by the power unit A. (For some applications, the gear box 11 may be of the Geneva type in which the shaft rotation takes place in progressive increments separated by intervals in which the shaft is stationary.)

My collector-ring assembly is generally indicated on FIG. 1 at B. As will be presently explained, it comprises a frame-supported portion which is fixed relative to the power unit A, and a shaft-supported portion which turns with the shaft 12 of the power unit A. One pair of electric wires 13 is connected into the frame-supported portion of the collector-ring assembly, for completing a circuit to an electric power source, and another pair of wires 14 are connected to the rotary part of my ring assembly, wires 14 being adapted for connection to the electrically operated rotary device, such as an illuminated display, which is driven by the shaft 12.

As will presently be explained in greater detail, the frame-supported portion of the ring assembly B comprises a pair of cooperating parts, each preferably formed of molded plastic. The ring-support element proper is generally barrel shaped and is designated 15. The backing plate 16 and the ring-support element 15 are dimensioned to have essentially the same outer diameter and both pieces are provided with diametrically spaced ears 15a and 16a, apertured to receive supporting bolts 17 which secure them to the frame plate 18 behind which the power unit A is mounted. (It will be understood, of course, that the shaft 12 projects forwardly through the frame plate 18, a suitable aperture being provided for that purpose.)

The rotating element 19 of my collector-ring assembly is also preferably fashioned from a single piece of molded plastic. Element 19, as will presently be explained in greater detail, is the brush-carrying component of my invention. It is provided with a central aperture 19a dimensioned to fit slidably over the threaded outer portion of shaft 12, being secured in position thereon by lock nut 20.

I shall now, with particular reference to FIGS. 3–6, describe in detail the structure and cooperative action of the various parts of my collector-ring assembly.

The assembly as a whole is indicated in section in FIG. 3. As may be noted therefrom, my collector-ring assembly comprises three structural parts, each of which may conveniently be molded from a suitable plastic such as polystyrene, having good electrical insulating properties and mechanical strength. Piece 15, as previously noted, is the ring-carrying part of my assembly, piece 19 is the brush-carrying part, and piece 16 serves as a back plate and insulating member.

The ring-carrying element 15 is shown in detail in the central portion of exploded view 4 and in FIG. 6. It comprises a cylindrical side wall surrounding a transverse web 22, centrally apertured at 22a to provide clearance for the shaft 12. An inner cylindrical wall 23 is formed on the upper surface of web 22 coaxially disposed relative to the outer wall of the piece 15. A pair of ring-shaped metal contact members 24a and 24b are secured on the upper surface of the web 22, ring 24a occupying the space between the inner and outer cylindrical walls, and ring 24b occupying the surface of web 22 between the inner cylindrical wall 23 and the central aperture 22a. These rings are riveted to the web 22 by a pair of diametrically disposed small rivets, as shown in FIG. 6.

The wires 13 which provide electrical contact to the rings 24a and 24b pass externally of the piece 15 through a suitable recess in the side wall thereof and are respectively soldered to the ring-securing rivets 31, one of the wires being soldered to a rivet which secures ring 24a and the other to a rivet which secures ring 24b. This is best shown in FIG. 6.

The rotary piece 19 is also preferably molded from a single piece of plastic; it consists generally of a disc provided with a backwardly extending rim flange, dimensioned to be received readily within the cylindrical outer wall of piece 15. The central zone of the disc portion of part 19 is relieved at 19a to receive the shaft 12, and the aperture 19a is flanked by a short cylindrical boss 25 having a plurality of ribs 26 extending radially outward therefrom. When my collector-ring apparatus is fully assembled as shown in FIG. 3, these ribs bear against the end surface of the inner cylindrical wall 23 of part 15, the spacing between the respective parts of the apparatus being thereby defined when the lock nut 20 is tightened on a shaft 12. The plastic chosen for the structural parts 15 and 19 should be one having the property of possessing the low sliding friction between adjoined surfaces; many well-known plastics in general use have this property.

Extending inward from the disc portion of piece 19 are four brush-holding bosses 27, each of which is apertured axially to provide a central passage of relatively large size and a smaller hold through its top wall. The bosses 27 are disposed in two pairs, spaced at differing distances from the center of piece 19. Two of the bosses 27 are positioned to be received within the cylindrical recess between the inner and outer walls of piece 15, and the other two bosses 27 are similarly positioned to be received within the inner recess defined by the cylindrical wall 23 and the central aperture of 22a of piece 15. This relationship is best shown in FIG. 3.

Metallic contact brushes 28 and 29 are secured to the outer and inner bosses 27, these contact brushes being arcuate in shape and flared backward from their anchors so as to bear against the contact rings 24a and 24b when piece 19 is seated in its operating position as shown in FIG. 3. The contact brushes 28 and 29 may be made of phosphor bronze or other suitable resilient metal, and the contact surfaces thereof which bear against the rings 24a and 24b may if desired be coated with silver or other suitable contact material. If the application is one in which the relative movement of the brushes against the rings is slow, it may be unnecessary to use any special contact plating on the rubbing surfaces.

The rivets which hold the brushes 28 and 29 to their respective bosses 27 are held in the small terminal apertures of the bosses 27, after being introduced through the larger openings communicating therewith, and the contact wires 14 are soldered respectively to one of the rivets holding brush 28 and one of the rivets holding brush 29, the wires passing externally of the assembled apparatus through the central openings in the bosses 27. This may be best seen in FIG. 4.

The back plate 16 may be molded from the same type of plastic used for pieces 15 and 19; it is generally disc-shaped and is provided with small molded guides 31 circumferentially spaced at the proper radial distance to fit snugly within the inner rim of piece 15's outer side wall. In addition, the back plate 16 is provided with apertured ears 16a diametrically disposed for registration with the corresponding ears 15a, by means of which the stationary parts of my assembly are anchored to the frame plate 18 through means of screws 17. Back plate 16 is centrally apertured to receive the shaft 12 and may also be provided with a forwardly extending cylindrical boss 32 which effectively insulates the shaft 12 from the ring 24b and brush 29, preventing the possibility of arc-over. When back plate 16 is properly positioned behind the piece 15, as shown in FIG. 3, it insulates from the frame plate 18 the soldered terminals and exposed ends of the wires 13.

When my collector-ring assembly is mounted on a rotary shaft as shown in FIGS. 1 and 3, the rotary member 19 will turn with the shaft, the brushes 28 and 29 being thereby rotated over the surfaces of the rings 24a and 24b respectively, and electric power fed to the stationary wires 13 may thereby be transmitted to a load device (not shown) rotated by shaft 12 and connected to the wires 14 which are carried by piece 19.

To insure a rigid union between the rotary member 19 and the shaft 12, the shaft 12 may be stepped inwardly, as indicated at 33, to define a shoulder against which the cylindrical boss 25 bears when the lock nut 20 is tightened. In this manner, danger of slippage between the shaft 12 and the member 19 is eliminated. If this construction is employed, the relative dimensions of the inner cylindrical wall 23 of part 15 and the ribs 26 of part 19 may be selected so as to provide a slight clearance, rather than a bearing relationship.

While I have in this specification described in considerable detail a typical embodiment of my invention, together with various alternative constructions thereof, it will be understood that this description has been for purposes of illustration only. Various modifications of the disclosed structure may be made. For example, the assembly may be constructed so as to have the brushes carried by the stationary member and the rings carried by the rotatable member which turns with shaft 12. Other such modifications within the spirit of the invention will readily occur to skilled readers of this specification. It is therefore my desire that the scope of my invention be determined primarily by reference to the appended claims.

I claim:

1. A collector-ring assembly comprising a pair of elements molded of insulating material and disposed in facing relation, said elements each having a disc-shaped portion and at least one of said elements having also a cylindrical rim extending toward said other element, each of said disc portions having an inner surface and an outer surface, the inner surfaces being those facing one another, each of said disc portions being also provided with a central aperture adapted to receive a rotatable shaft, a pair of electrically conducting rings formed of stamped sheet metal and spacedly secured, as by riveting, to the inner surface of one of said disc portions in coaxial relation to the central aperture thereof, a plurality of brush-supporting means situated on the inner surface of said other disc portion, a pair of electrically conducting resilient brushes secured respectively to said brush-supporting means and positioned to bear respectively against different ones of said rings, said brushes being integrally formed of resilient sheet metal and being arcuate in shape, means adapted to secure one of said elements to a shaft passing through the central aperture thereof, operative to cause said element to rotate with said shaft, means carried by said other element for anchoring the same to an object such as the frame of an electric motor, thereby holding said element stationary, a first pair of wires respectively joined to different ones of said rings and projecting externally of said ring-carrying element, and a second pair of wires respectively connected to different ones of said brushes, said second pair of wires projecting externally of said brush-carrying element, there being also formed integrally on the inner surface of said ring-carrying element an annular boss separating said rings and extending between said brushes.

2. A collector-ring assembly comprising a pair of elements molded of insulating material and disposed in facing relation, said elements each having a disc-shaped portion and at least one of said elements having also a cylindrical rim extending toward said other element, each of said disc portions having an inner surface and an outer surface, the inner surfaces being those facing one another, each of said disc portions being also provided with a central aperture adapted to receive a rotatable shaft, a pair of electrically conducting rings formed of stamped sheet metal and spacedly secured, as by riveting, to the inner surface of one of said disc portions in coaxial relation to the central aperture thereof, a plurality of brush-supporting means situated on the inner surface of said other disc portion, a pair of electrically conducting resilient brushes secured respectively to said brush-supporting means and positioned to bear respectively against different ones of said rings, said brushes being integrally formed of resilient sheet metal and being arcuate in shape, means adapted to secure one of said elements to a shaft passing through the central aperture thereof, operative to cause said element to rotate with said shaft, means carried by said other element for anchoring the same to an object such as the frame of an electric motor, thereby holding said element stationary, a pair of electrically conducting securing means passing through the disc portion of said ring-carrying element, making electrical contact respectively with said pair of rings and being accessible from the outer surface of said element, a first pair of wires respectively connected to different ones of said securing means on the outer surface of said ring-carrying element, said wires projecting externally of said ring-carrying element from the outer surface thereof, a second pair of wires respectively connected to different ones of said brushes and projecting externally of said brush-carrying element from the outer surface thereof, and an insulating backing plate adapted to overlie the outer surface of said ring-carrying element.

3. The collector-ring assembly defined in claim 2 having also an annular boss of insulating material disposed on the inner surface of said ring-carrying element and integrally molded therewith, said boss separating said rings and extending between said brushes.

References Cited in the file of this patent

UNITED STATES PATENTS

| | | |
|---|---|---|
| 565,137 | Date et al. | Aug. 4, 1896 |
| 1,199,172 | Garrison | Sept. 26, 1916 |
| 2,037,457 | Colson | Apr. 14, 1936 |
| 2,433,938 | Varner | Jan. 6, 1948 |
| 2,466,499 | Sokolik | Apr. 5, 1949 |
| 2,895,572 | Shinn | Aug. 4, 1959 |
| 3,020,509 | Whelen | Feb. 6, 1962 |

FOREIGN PATENTS

| | | |
|---|---|---|
| 951,073 | Germany | Oct. 18, 1956 |